United States Patent
Ikenori et al.

(10) Patent No.: US 10,626,660 B2
(45) Date of Patent: Apr. 21, 2020

(54) OPENING-AND-CLOSING APPARATUS

(71) Applicant: SHIROKI CORPORATION, Fujisawa-shi, Kanagawa (JP)

(72) Inventors: Kenta Ikenori, Uji (JP); Junya Kurita, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 443 days.

(21) Appl. No.: 15/500,850

(22) PCT Filed: Jun. 17, 2015

(86) PCT No.: PCT/JP2015/067398
§ 371 (c)(1),
(2) Date: Jan. 31, 2017

(87) PCT Pub. No.: WO2016/017310
PCT Pub. Date: Feb. 4, 2016

(65) Prior Publication Data
US 2017/0218677 A1     Aug. 3, 2017

(30) Foreign Application Priority Data
Aug. 1, 2014 (JP) ................. 2014-157834

(51) Int. Cl.
*E05F 15/70* (2015.01)
*E05F 15/611* (2015.01)
(Continued)

(52) U.S. Cl.
CPC ............ *E05F 15/70* (2015.01); *B62D 25/105* (2013.01); *E05B 81/20* (2013.01); *E05F 15/611* (2015.01);
(Continued)

(58) Field of Classification Search
CPC .......... E05F 15/70; E05F 15/622; E05F 15/75
See application file for complete search history.

(56) References Cited

U.S. PATENT DOCUMENTS 6,064,165 A * 5/2000 Boisvert ................ B60J 7/0573
                                                    318/465
8,729,837 B2 * 5/2014 Tandrow ................ G05B 19/19
                                                    318/268
(Continued)

FOREIGN PATENT DOCUMENTS

CN  103187922 A  7/2013
JP  2001-199243 A  7/2001
(Continued)

OTHER PUBLICATIONS

Office Action dated Sep. 20, 2017, by the Chinese Patent Office in corresponding Chinese Patent Application No. 201580041367.0. (6 pages).
(Continued)

*Primary Examiner* — Gregory J Strimbu
(74) *Attorney, Agent, or Firm* — Buchanan, Ingersoll & Rooney PC

(57) ABSTRACT

An opening-and-closing body is configured to open and close an opening and to move in a closing direction across a first section of movement in which the opening-and-closing body moves against the weight of the opening-and-closing body and a second section of movement in which the weight of the opening-and-closing body assists the movement of the opening-and-closing body in the closing direction. A driver is configured to drive the opening-and-closing body in the closing direction. A predictor is configured to predict when the opening-and-closing body will shift from the first section of movement to the second section of movement as the driver drives the opening-and-closing body in the closing direction.

5 Claims, 11 Drawing Sheets

(51) Int. Cl.
    *E05F 15/622*     (2015.01)
    *E05F 15/71*     (2015.01)
    *E05F 15/75*     (2015.01)
    *B62D 25/10*     (2006.01)
    *E05B 81/20*     (2014.01)

(52) U.S. Cl.
    CPC ............ *E05F 15/622* (2015.01); *E05F 15/71* (2015.01); *E05F 15/75* (2015.01); *E05Y 2900/548* (2013.01)

(56) References Cited

U.S. PATENT DOCUMENTS

| | | | |
|---|---|---|---|
| 10,400,485 B2* | 9/2019 | Kurita | |
| 2001/0008057 A1 | 7/2001 | Sakaue et al. | |
| 2013/0169197 A1 | 7/2013 | Jang et al. | |
| 2014/0250787 A1* | 9/2014 | Olmsted | E05F 15/70 49/31 |
| 2017/0342758 A1* | 11/2017 | Grudzinski | E05F 15/616 |

FOREIGN PATENT DOCUMENTS

| | | |
|---|---|---|
| JP | 2002-364249 A | 12/2002 |
| JP | 2004-204474 A | 7/2004 |
| JP | 2007-217975 A | 8/2007 |
| JP | 2012-102516 A | 5/2012 |
| JP | 2013-139707 A | 7/2013 |

OTHER PUBLICATIONS

International Search Report (PCT/ISA/210) dated Sep. 1, 2015, by the Japan Patent Office as the International Searching Authority for International Application No. PCT/JP2015/067398.

Written Opinion (PCT/ISA/237) dated Sep. 1, 2015, by the Japan Patent Office as the International Searching Authority for International Application No. PCT/JP2015/067398.

* cited by examiner

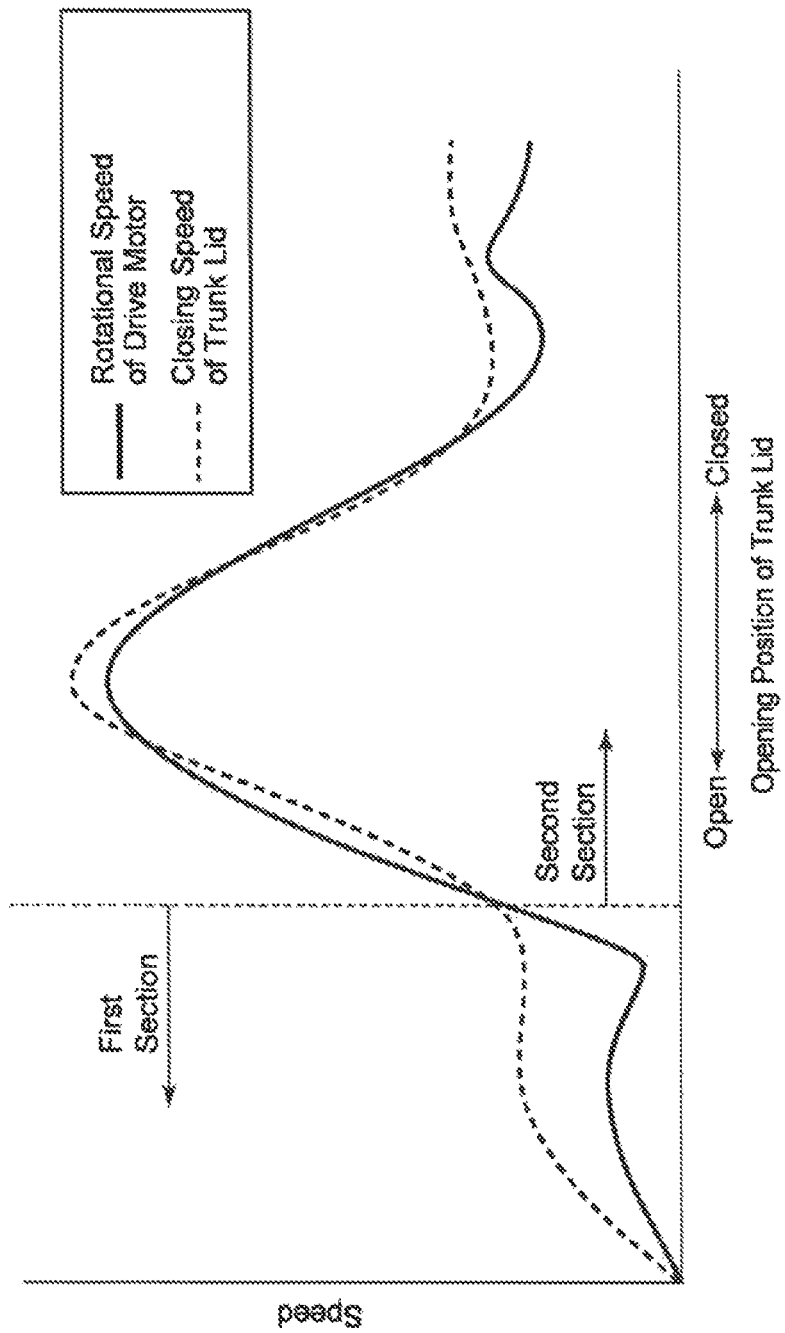

OPENING-AND-CLOSING APPARATUS

TECHNICAL FIELD

The present invention relates to a drive control apparatus for an opening-and-closing body of a vehicle such as, e.g., a power trunk lid, a power back door, etc.

BACKGROUND ART

A power trunk lid for opening and closing the opening of a trunk of a vehicle body is known as a drive control apparatus for an opening-and-closing body of a vehicle.

In vehicles equipped with a power trunk lid apparatus, there is a demand to make the maximum opening angle of the trunk lid as large as possible. As a result, the number of vehicles in which the opening angle of the trunk lid is set to exceed a specific critical angle as shown in FIG. 10 has been increasing. In such arrangements, for example, disclosed in Japanese Unexamined Patent Publication No. 2004-204474, when the trunk lid is closed from the fully-opened position, the trunk lid moves in the closing direction against its own weight in a first section SE1, which is a range of positions of the trunk lid in which the opening angle of the trunk lid exceeds the critical angle, and the trunk lid moves in the closing direction according to its own weight in a second section SE2, which is a range of positions of the trunk lid in which the opening angle of the trunk lid is smaller than the critical angle.

The driver which drives the trunk lid in the closing direction is configured of, e.g., an extendable/retractable drive unit, in which one end and another end thereof are pivotally mounted to the vehicle body and the trunk lid, respectively, and which is extendably/retractably driven by a drive motor. When the trunk lid is driven in the closing direction from the fully-opened position, the driving output (the rotational speed of the drive motor) of the extendable/retractable drive unit is feedback-controlled based on the deviation of a target closing speed for control of the trunk lid and the current closing speed to make the closing speed of the trunk lid vary as smooth as possible.

SUMMARY OF THE INVENTION

Technical Problem

However, in this type of trunk-lid drive control apparatus, at the moment in time at which the trunk lid shifts from the first section to the second section, the weight of the trunk lid that has been acting as a resistance to the driving for closing the trunk-lid before then completely changes to act so as to facilitate the driving for closing the trunk-lid as shown in FIGS. 10 and 11; accordingly, there is a problem that the visual quality at the time the trunk lid is driven in the closing direction deteriorates as a result that the trunk lid advances by its own weight following an abrupt increase in the closing speed of the trunk lid. Namely, since the deviation of a target closing speed for control of the trunk lid and the current closing speed temporarily jumps substantially, the feedback control becomes no longer capable of following this operation.

The present invention has been devised in consideration of the above-mentioned problems, and it is an objective to provide a drive control apparatus for an opening-and-closing body which can achieve smooth and good appearance when closure driving by preventing the closing speed of the opening-and-closing body from fluctuating drastically.

Solution to Problem

An opening-and-closing apparatus is provided, including an opening-and-closing body configured to open and close an opening and move across a first section, in which the opening-and-closing body moves in a closing direction against its own weight, and a second section, in which the opening-and-closing body moves in the closing direction according to the own weight; a driver configured to drive the opening-and-closing body in the closing direction continuously from the first section to the second section; a predictor configured to predict when the opening-and-closing body will shift from the first section to the second section as the driver drives the opening-and-closing body in the closing direction toward the second section from the first section; and a drive controller configured to decrease a driving output of the driver for driving the opening-and-closing body in the closing direction according to a result of the prediction made by the predictor.

The driver can include a drive motor configured to drive the opening-and-closing body in the closing direction, and the predictor can predicts that the opening-and-closing body will shift from the first section to the second section based on a rotational speed of the drive motor.

After the drive motor rotates by a predetermined amount, the predictor can monitor the rotational speed of the drive motor for a consecutive plurality of times and renews a minimum rotational speed thereof. Every time the predictor monitors the rotational speed of the drive motor, the predictor determines as to whether or not a current rotational speed of the drive motor from which the minimum rotational speed is subtracted has become greater than a predetermined threshold value, and predicts that the opening-and-closing body will shift from the first section to the second section upon determining, a prescribed number of times, that the current rotational speed of the drive motor from which the minimum rotational speed is subtracted has become greater than the predetermined threshold value.

After the drive motor rotates by a predetermined amount, the predictor can monitor the rotational speed of the drive motor for a consecutive plurality of times. Every time the predictor monitors the rotational speed of the drive motor, the predictor determines as to whether or not a current rotational speed of the drive motor from which the previous rotational speed is subtracted has become greater than a predetermined threshold value, and predicts that the opening-and-closing body will shift from the first section to the second section upon determining, a prescribed number of times, that the current rotational speed of the drive motor from which the previous rotational speed is subtracted has become greater than the predetermined threshold value.

The drive control apparatus for an opening-and-closing body of the present invention can further include an opening position detection sensor which detects an opening position of the opening-and-closing body. The predictor predicts that the opening-and-closing body will shift from the first section to the second section based on the opening position of the opening-and-closing body that is detected by the opening position detection sensor.

The driver can commence the driving of the opening-and-closing body in the closing direction from an open resting state thereof. The drive controller stepwisely increases, from zero, the driving output of the driver for driving the opening-and-closing body in the closing direction, and thereafter decreases the driving output of the driver for driving the opening-and-closing body in the closing direction upon the predictor predicting that the opening-and-closing body will shift from the first section to the second section.

The drive controller can alter a manner of decreasing the driving output of the driver for driving the opening-and-closing body in the closing direction in accordance with at least one of the following factors: a temperature of the driver or ambient temperature thereof, an inclination of the main body, to which the opening-and-closing body is mounted, and counterforce caused by the driver.

Advantageous Effects of the Invention

The predictor predicts that the opening-and-closing body will shift from the first section to the second section when the driver drives the opening-and-closing body in the closing direction toward the second section from the first section, and the drive controller decreases the driving output of the driver for driving the opening-and-closing body in the closing direction according to the result of the prediction made by the predictor, which prevents the closing speed of the opening-and-closing body from increasing (fluctuating) drastically, thus making it possible to achieve smooth and good appearance when closure driving.

The predictor can predict that the opening-and-closing body will shift from the first section to the second section with high precision and reliability based on the rotational speed of the drive motor.

It can be predicted that the opening-and-closing body will shift from the first section to the second section with high precision and reliability simply by consecutively monitoring the rotational speed of the drive motor and carrying out a simple arithmetic operation. Furthermore, an erroneous prediction which may be made due to a disturbance can be avoided since it is predicted that the opening-and-closing body will shift from the first section to the second section upon determining, a prescribed number of times, that the current rotational speed of the drive motor from which the predetermined threshold value is subtracted has become greater than the minimum rotational speed.

It can be predicted that the opening-and-closing body will shift from the first section to the second section with high precision and reliability simply by consecutively monitoring the rotational speed of the drive motor and carrying out a simple arithmetic operation. Furthermore, an erroneous prediction which may be made due to a disturbance can be avoided since it is predicted that the opening-and-closing body will shift from the first section to the second section upon determining, a prescribed number of times, that the current rotational speed of the drive motor from which the previous rotational speed is subtracted has become greater than the predetermined threshold value.

The predictor can predict that the opening-and-closing body will shift from the first section to the second section with high precision and reliability based on the opening position of the opening-and-closing body that is detected by the opening position detection sensor.

It is possible to prevent noise from occurring with efficiency at the commencement of the driving of the opening-and-closing body in the closing direction since a so-called STEP-UP process, which stepwise increases the driving output, is performed when the opening-and-closing body in an open resting state is driven in the closing direction. Since the driver, which drives the opening-and-closing body in the closing direction, has a no-load range which is created by play between the driver and the hinged portion at the commencement of the movement of the driver from an open resting state, if the driving output is increased in a stroke from an open resting state of the opening-and-closing body, there is a possibility of the drive motor rotating at high speed (idling in the no-load range) and thereby causing noise at the commencement of the driving of the opening-and-closing body in the closing direction.

The degree of decrease in the driving output of the driver for driving the opening-and-closing body in the closing direction can be optimized according to various parameters such as, e.g., the temperature of the driver or ambient temperature thereof, the inclination of the main body, to which the opening-and-closing body is mounted, a counterforce caused by said driver, etc.

BRIEF DESCRIPTION OF DRAWINGS

FIG. 11 is a second diagram illustrating a technical problem on a conventional power trunk lid mounted to a vehicle.

DESCRIPTION OF EMBODIMENTS

An embodiment of a drive control apparatus for an opening-and-closing body, according to the present invention, which is applied to a power trunk lid apparatus (opening-and-closing apparatus) 1 will be described hereinbelow with reference to FIGS. 1 through 9.

Figure 1:
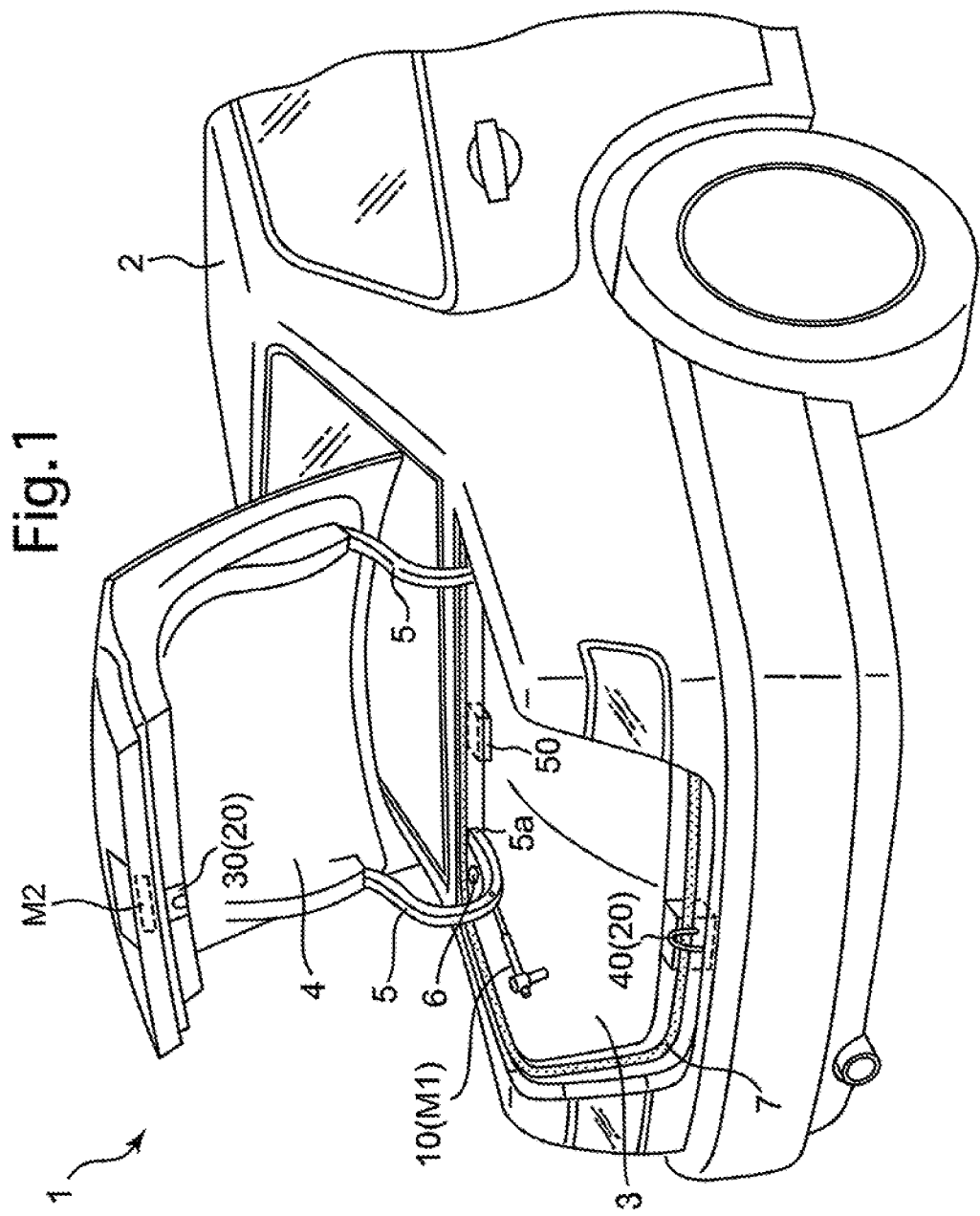
FIG. 1 is a perspective view showing a configuration of a power trunk lid apparatus according to the present invention.
Figure 2:
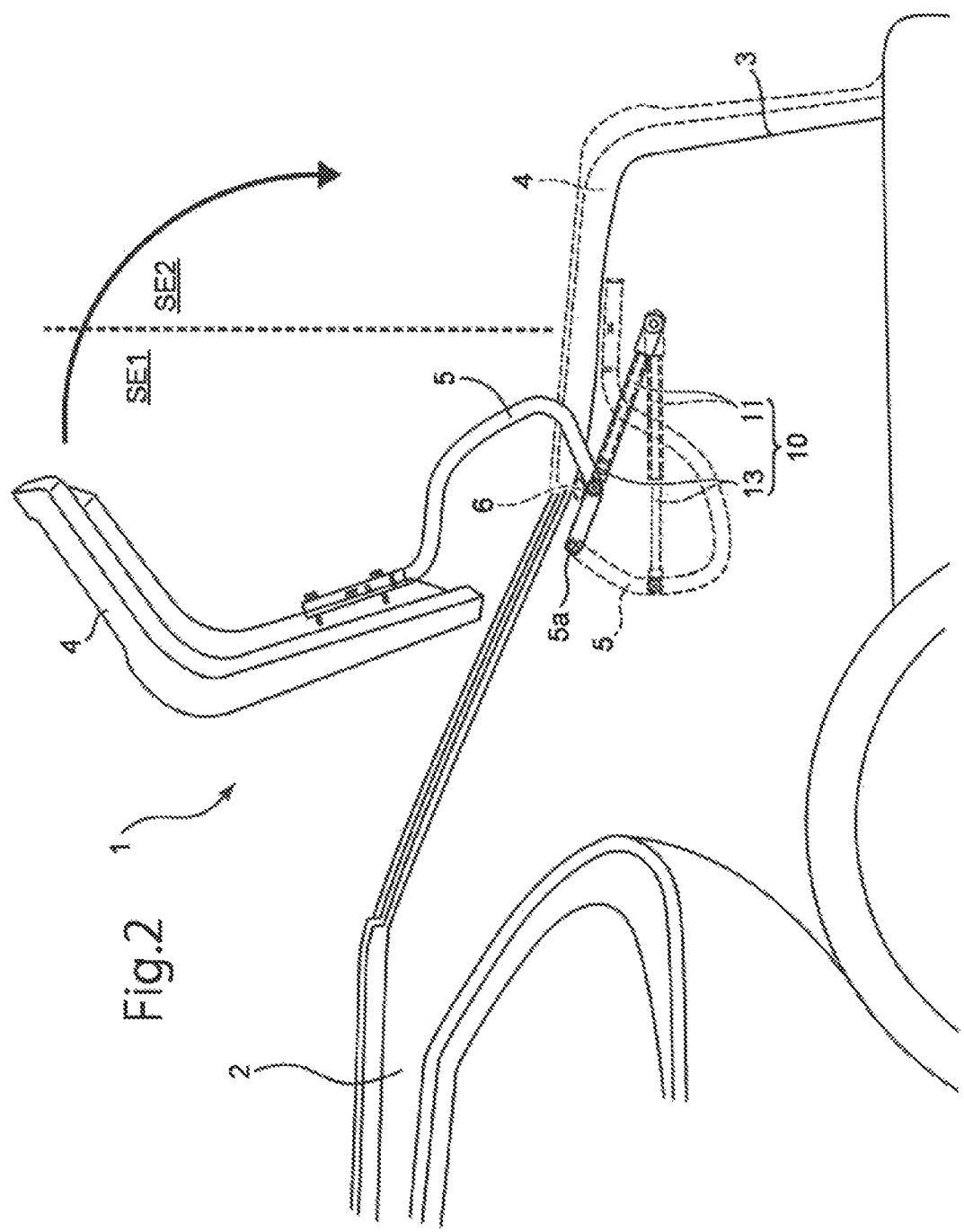
FIG. 2 is a side view showing an opening and closing operation of the power trunk lid apparatus according to the present invention.

As shown in FIGS. 1 and 2, the power trunk lid apparatus 1 enables a trunk opening (opening) 3 of a vehicle body (main body) 2 to be opened and closed via a trunk lid (opening-and-closing body) 4. The trunk lid 4 is pivotally mounted onto the vehicle body 2 via a pair of hinge members 5 which are arranged in the vehicle leftward/rightward direction, and the trunk lid 4 is openable and closable about pivot shafts 5*a* of the hinge members 5. A pair of stopper members 6 are provided in the vehicle leftward/rightward direction of the trunk opening 3 of the vehicle body 2 to correspond to the pair of hinge members 5 of the trunk lid 4 and respectively abut against the pair of hinge members 5 with the trunk lid 4 at a fully-opened position. An entire peripheral edge portion of the trunk opening 3 of the vehicle body 2 is provided with a weather strip 7, which is elastically deformable between the vehicle body 2 and the trunk lid 4 at a fully-closed position thereof, and prevents water from infiltrating into the trunk opening 3.

The power trunk lid apparatus 1 is provided with an extendable/retractable drive unit (driver) 10 which drives the trunk lid 4 so that it opens and closes. One end of the extendable/retractable drive unit 10 is pivotally mounted onto a wall surface of the trunk opening 3 of the vehicle body 2 and the other end of the extendable/retractable drive unit 10 is pivotally mounted onto a hinge member 5 of the trunk lid 4, and the extendable/retractable drive unit 10 is driven by a trunk drive motor (PTL drive motor) M1 to extend and contract.

Figure 3:
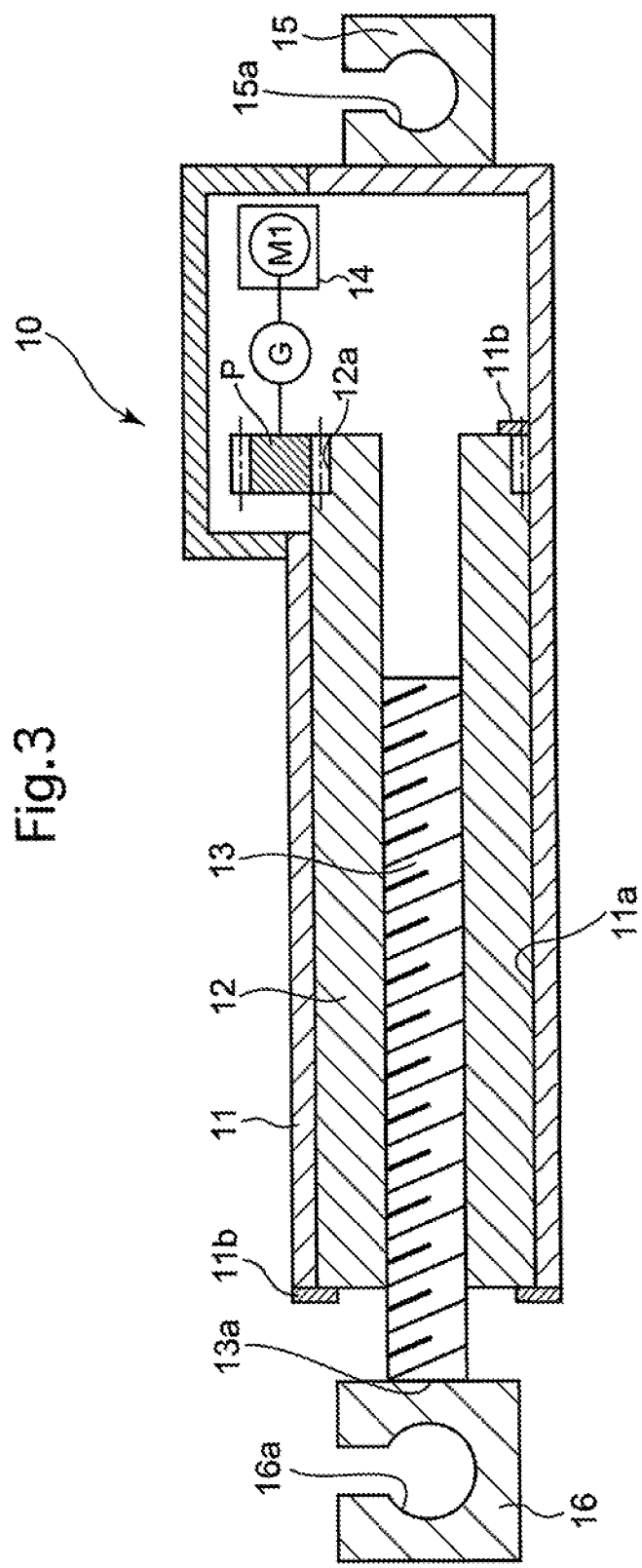
FIG. 3 is a conceptual view showing a unitary construction of an extendable/retractable drive unit (driver).

As shown in FIG. 3, the extendable/retractable drive unit 10 is provided with a bottomed housing 11, a rotary nut 12 which is screw-engaged with a stopper 11*b* at an inner cylindrical surface 11*a* of the bottomed housing 11, and a rod member 13 which is screw-engaged with the rotary nut 12. A regenerative braking circuit 14 (which includes the trunk drive motor M1), a reduction mechanism G and a pinion gear P are provided inside the bottomed housing 11, and the pinion gear P is in mesh with an outer peripheral gear 12*a* of the rotary nut 12. Upon the trunk drive motor M1 of the regenerative braking circuit 14 forwardly/reversibly rotating, the driving force of the trunk drive motor M1 is transferred to the rotary nut 12 via the reduction mechanism G and the pinion gear P, and the rotary nut 12 forwardly/reversibly rotates at a predetermined position within the bottomed housing 11. The rod member 13 advances and retracts relative to the bottomed housing 11 (the rotary nut 12) in accordance with the rotation of the rotary nut 12. A joint 15 provided with a ball accommodation portion 15*a* is connected to the bottomed housing 11. A ball stud (not shown in the drawings), which is provided on the wall surface of the trunk opening 3 of the vehicle body 2, is fitted into the ball accommodation portion 15*a*. A joint 16 provided with a ball accommodation portion 16*a* is connected to an end portion 13*a* of the rod member 13, and a ball stud (not shown in the drawings) provided on the hinge member 5 of the trunk lid 4 is fitted into the ball accommodation portion 16*a*. Due to the above-described configuration, the extendable/retractable drive unit 10 extends and retracts in accordance with the forward/reverse rotation of the trunk drive motor M1 of the regenerative braking circuit 14 to thereby open and close the trunk lid 4 (FIG. 2).

The extendable/retractable drive unit 10 can switch between either an inoperative mode (manual operation mode) and an operative mode (electrically-powered operation mode) as an operation mode for opening and closing the trunk lid 4. In the inoperative mode of the extendable/retractable drive unit 10, the regenerative braking circuit 14, provided with the trunk drive motor M1, becomes an open circuit and does not rotatably drive the trunk drive motor M1, so that the trunk lid 4 does not open or close unless an external force (a manual opening/closing operational force, or an external force caused by wind and rain) is applied to the trunk lid 4. In the operative mode of the extendable/retractable drive unit 10, the regenerative braking circuit 14, provided with the trunk drive motor M1, becomes a closed circuit, and the trunk drive motor M1 rotatably drives the trunk lid 4 in the opening/closing direction, so that the trunk lid 4 automatically opens and closes even if the user does not push the trunk lid 4.

The power trunk lid apparatus 1 is provided with a closer drive mechanism 20 which drives the trunk lid 4 between a half-latched position and a fully-latched position. The closer drive mechanism 20 is provided with a lock mechanism 30 provided on the trunk lid 4, and a striker 40 provided on the wall surface of the trunk opening 3 of the vehicle body 2.

Figure 4:
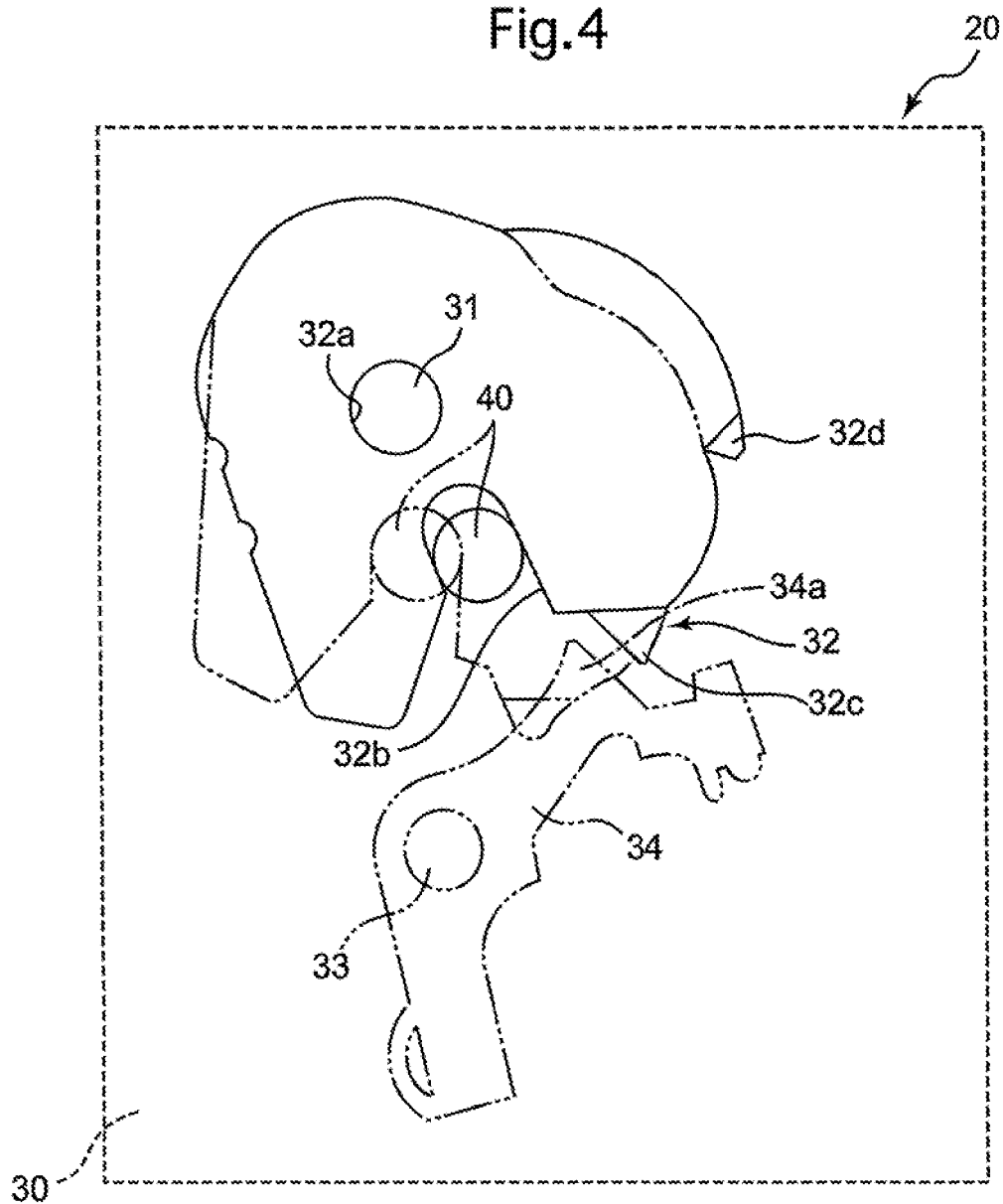
FIG. 4 is a diagram showing a configuration and operation of a closer drive mechanism.

As shown in FIG. 4, the lock mechanism 30 is provided with a hook 32 which is coupled with a rotational shaft member 31, and a ratchet 34 which is rotatable about a rotational shaft member 33. The hook 32 is provided with a rotational support hole 32*a* which is supported by the rotational shaft member 31 to be rotatable relative to the rotational shaft member 31, a striker holding groove 32*b*, a fully-latched engaging portion 32*c*, and a half-latched engaging portion 32*d*. The hook 32 is rotatably biased in the clockwise direction (lock-release direction) with respect to FIG. 4 by a spring not shown in the drawings. The ratchet 34 is provided with a lock portion 34*a* which is disengageably engageable with the fully-latched engaging portion 32*c* and the half-latched engaging portion 32*d* of the hook 32, and the ratchet 34 is rotatably biased in the counterclockwise direction (locking direction) with respect to FIG. 4 by a spring not shown in the drawings. The above-described hook 32, ratchet 34 and striker 40 hold the trunk lid 4 at each of the half-latched position and the fully-latched position.

The closer drive mechanism 20 is provided with a closer drive motor (LCL motor) M2 (see FIG. 1) which rotatably drives the hook 32 forwardly/reversibly. Forward/reverse rotation of the closer drive motor M2 causes the closer drive mechanism 20 to be driven between the half-latched state and the full-latched state. In addition, the closer drive mechanism 20 rotates the ratchet 34 at a predetermined timing.

When the trunk lid 4 is at the fully-latched position, the closer drive mechanism 20 is in a fully-latched state in which the striker 40 and the striker holding groove 32*b* of the hook 32 are engaged with each other and the fully-latched engaging portion 32*c* of the hook 32 and the lock portion 34*a* of the ratchet 14 are engaged with each other.

In the case where the closer drive motor M2 is rotated to open the trunk lid 4 from the fully-latched position, the ratchet 34 rotates in the clockwise direction with respect to FIG. 4, the engagement between the fully-latched engaging portion 32*c* and the lock portion 34*a* is released, the hook 32 rotates slightly in the clockwise direction by a biasing force of a spring (not shown in the drawings), and the lock portion 34*a* and the half-latched engaging portion 32*d* engage with each other. This position is the half-latched position (half-latched state) of the trunk lid 4 obtained via the closer drive mechanism 20.

When the trunk lid 4 is opened from the half-latched position, the ratchet 34 rotates in the clockwise direction with respect to FIG. 4, which causes the engagement between the lock portion 34*a* and the half-latched engaging portion 32*d* to be released, so that the hook 32 further rotates in the clockwise direction by the biasing force of the spring (not shown in the drawings), and the striker 40 escapes from the striker holding groove 32*b* of the hook 32. In other words, the closer drive mechanism 20 enters a released state.

As shown in FIG. 2, the power trunk lid apparatus 1 of the present embodiment is configured so that the opening angle of the trunk lid 4 exceeds a specific critical angle for the purpose of securing the maximum opening angle of the trunk lid 4 as large as possible. For this reason, when the trunk lid 4 is closed from the fully-opened position, the trunk lid 4 moves in the closing direction against its own weight in a "first section SE1", which is a range of positions in which the opening angle of the trunk lid 4 exceeds the critical angle, and the trunk lid 4 moves in the closing direction according to its own weight in a "second section SE2", which is a range of positions in which the opening angle of the trunk lid is smaller than the critical angle (the trunk lid 4 moves across the first and second sections SE1 and SE2). When the trunk lid 4 is driven in the closing direction continuously from the first section SE1 to the second section SE2 across the border therebetween via the extendable/retractable drive unit 10, the weight of the trunk lid 4 that has been acting as a resistance to the driving for closing the trunk-lid 4 before then completely changes to act so as to facilitate the driving for closing the trunk lid 4 at the moment in time at which the trunk lid 4 shifts from the first section SE1 to the second section SE2.

The power trunk lid apparatus 1 is provided with a drive control unit 50 which carries out the opening and closing drive control of the trunk lid 4 via the extendable/retractable drive unit 10 and the closer drive mechanism 20, and carries out the closing drive control of the trunk lid 4 from an open resting state, particularly in the first section (at the fully-opened position in the present embodiment).

Figure 5:
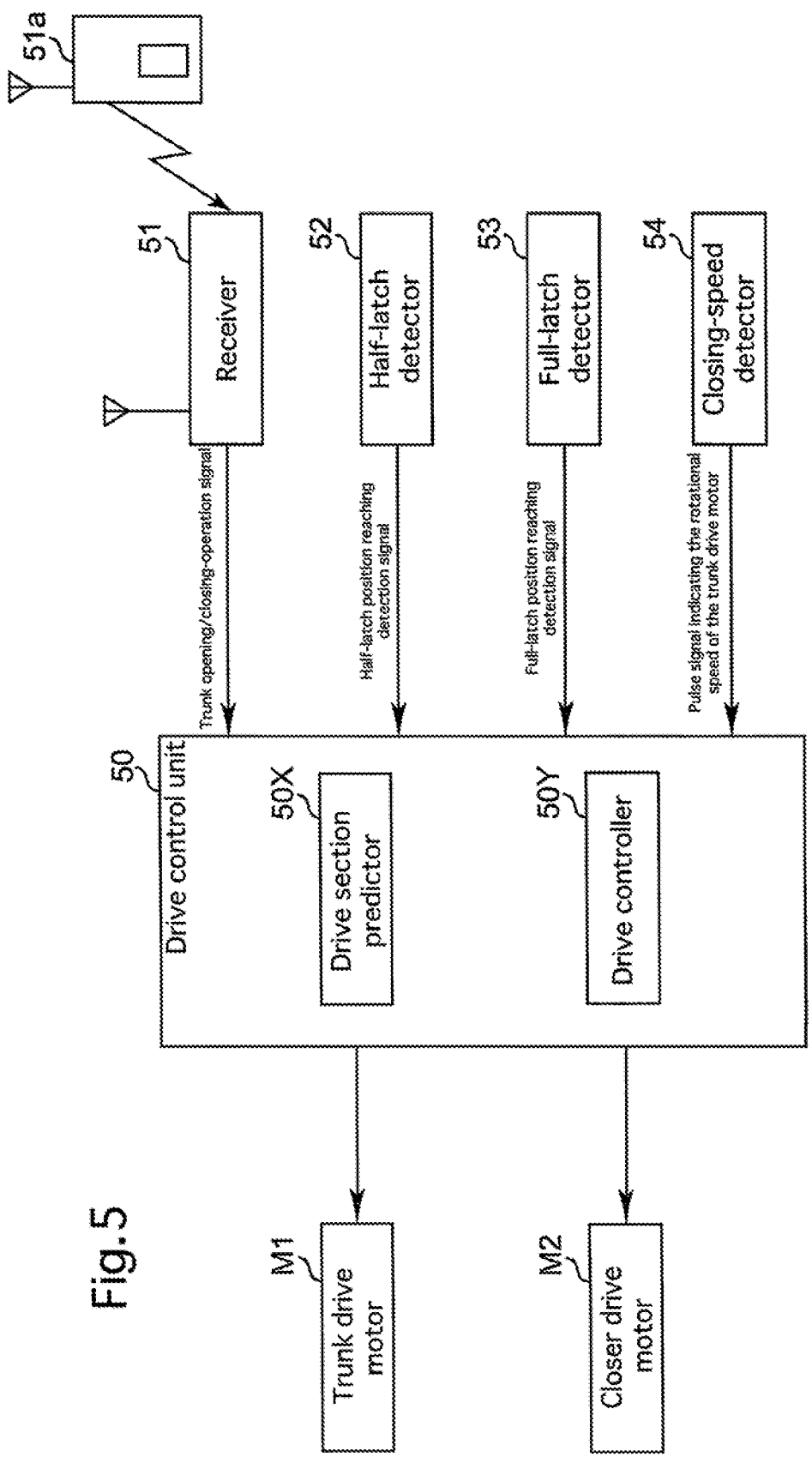
FIG. 5 is a functional block diagram centered around a drive control unit of the power trunk lid apparatus according to the present invention.

As shown in FIG. 5, a receiver 51, a half-latched detector 52, a fully-latched detector 53 and a closing-speed detector (rotational speed detector) 54 are connected to the drive control unit 50.

The receiver 51 receives a trunk closing-operation signal that is wirelessly transmitted from a wireless remote controller 51a, which is integrally formed with a key, and sends the trunk closing-operation signal to the drive control unit 50.

Upon detecting that the trunk lid 4 has reached the half-latched position (that the lock portion 34a and the half-latched engaging portion 32d have engaged with each other) when the trunk lid 4 is being closed, the half-latched detector 52 sends a half-latched position reaching detection signal to the drive control unit 50. The drive control unit 50 which has received this half-latched position reaching detection signal commences to perform a draw-in driving operation to draw in the trunk lid 4 via the closer drive mechanism 20 (the closer drive motor M2).

Upon detecting that the trunk lid 4 has reached the full-latched position (that the lock portion 34a and the full-latched engaging portion 32c have engaged with each other) during the draw-in driving operation to draw in the trunk lid 4 via the closer drive mechanism 20 (the closer drive motor M2), the full-latched detector 53 sends a full-latched position reaching detection signal to the drive control unit 50. The drive control unit 50 which has received this full-latched position reaching detection signal stops the trunk lid draw-in driving operation via the closer drive mechanism 20 (closer drive motor M2).

The closing-speed detector 54 is configured of, e.g., a magnet and a Hall IC (both not shown in the drawings) in the vicinity of the trunk drive motor M1 of the extendable/retractable drive unit 10, and detects the rotational speed of the trunk drive motor M1, which indicates the closing speed of the trunk lid 4, by converting the magnetic field generated by the magnet into an electrical signal via the Hall IC to thereby detect a pulse signal having a pulse width that corresponds to the number of revolutions of the trunk drive motor M1. The closing-speed detector 54 sends the rotational speed of the trunk drive motor M1 thus detected as a pulse signal to the drive control unit 50.

The drive control unit 50 is provided with a drive section predictor (predictor) 50X and a drive controller 50Y.

When the extendable/retractable drive unit 10 drives the trunk lid 4 toward the second section from the first section to close the trunk lid 4, the drive section predictor 50X predicts that the trunk lid 4 will shift from the first section to the second section based on the rotational speed of the trunk drive motor M1 which is sent from the closing-speed detector 54. Namely, when the trunk lid 4 is driven in the closing direction, the drive section predictor 50X predicts that the trunk lid 4 will soon move to the second section even though the trunk lid 4 currently stays in the first section.

In the first embodiment which will be discussed later, after the trunk drive motor M1 rotates by a predetermined amount, the drive section predictor 50X monitors the rotational speed of the trunk drive motor M1 for a consecutive plurality of times and renews the minimum rotational speed thereof; furthermore, every time the drive section predictor 50X monitors the rotational speed of the trunk drive motor M1, the drive section predictor 50X determines as to whether or not the current rotational speed of the trunk drive motor M1 from which the minimum rotational speed is subtracted has become greater than a predetermined threshold value, and predicts that the trunk lid 4 will shift from the first section to the second section upon determining, a prescribed number of times (e.g., two times), that the current rotational speed of the trunk drive motor M1 from which the minimum rotational speed is subtracted has become greater than the aforementioned predetermined threshold value.

In the second embodiment which will be discussed later, after the trunk drive motor M1 rotates by a predetermined amount, the drive section predictor 50X monitors the rotational speed of the trunk drive motor M1 for a consecutive plurality of times. Furthermore, every time the drive section predictor 50X monitors the rotational speed of the trunk drive motor M1, the drive section predictor 50X determines as to whether or not the current rotational speed of the trunk drive motor M1 from which the previous rotational speed is subtracted has become greater than a predetermined threshold value, and predicts that the trunk lid 4 will shift from the first section to the second section upon determining, a prescribed number of times (e.g., two times), that the current rotational speed of the trunk drive motor M1 from which the previous rotational speed is subtracted has become greater than the aforementioned predetermined threshold value.

When the trunk lid 4 is in an open resting state in the first section (the fully-opened position in the present embodiment), the drive controller 50Y commences to drive the trunk lid 4 in the closing direction via the extendable/retractable drive unit 10 (the trunk drive motor M1) and controls this trunk-lid closure driving upon a trunk closing-operation signal being input from the receiver 51.

Figure 6:
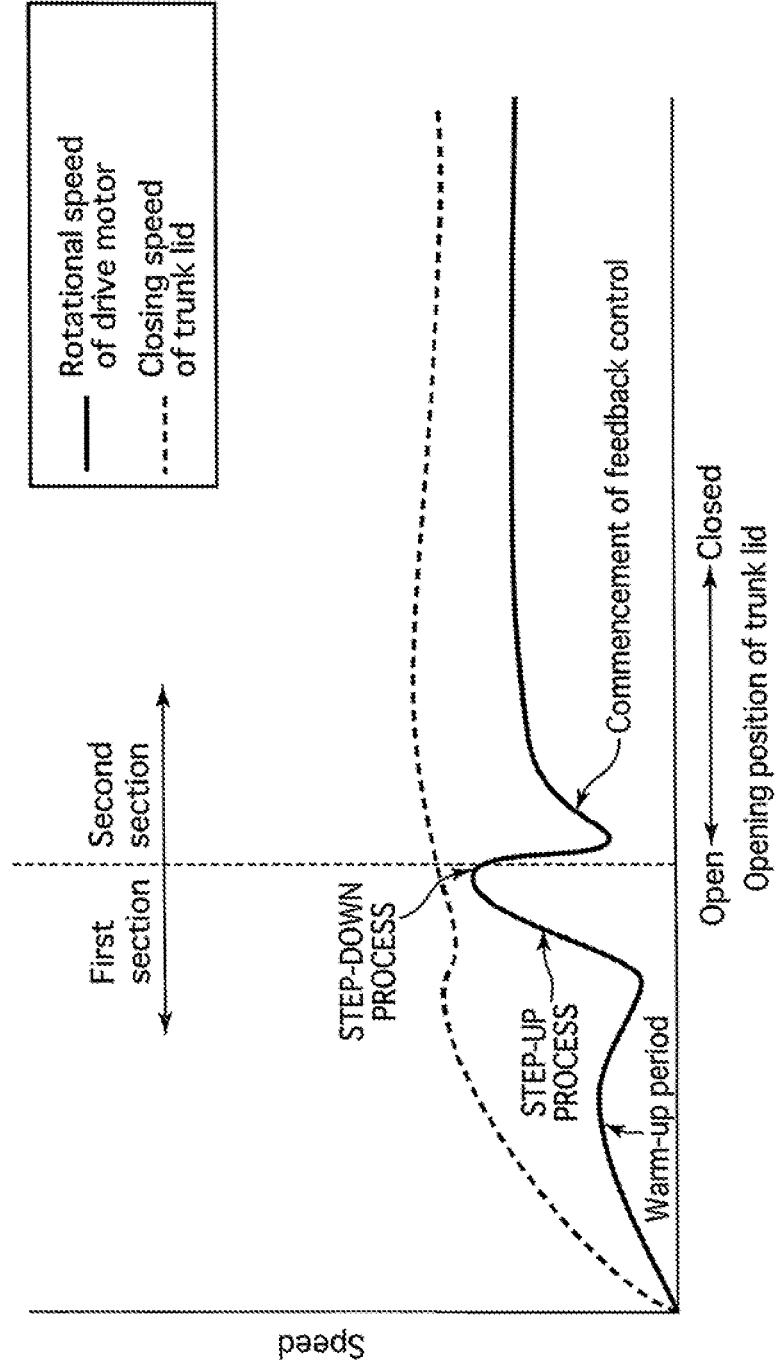
FIG. 6 is a diagram showing the relationship between the closing speed of the trunk drive motor and the closing speed of the trunk lid when the trunk-lid shifts from the first section to the second section at the time the trunk lid is driven in the closing direction.

More specifically, as shown in FIG. 6, the drive controller 50Y stepwisely increases the driving output of the extendable/retractable drive unit 10 (the rotational speed of the trunk drive motor M1) for driving the trunk lid 4 in the closing direction after a lapse of a predetermined warmup period from the time the trunk lid 4 is in an open resting state in the first section (e.g., the fully-opened position) (STEP-UP process); thereafter, according to the result of the prediction by the drive section predictor 50X, the drive controller 50Y decreases the driving output (the rotational speed of the trunk drive motor M1) of the extendable/retractable drive unit 10 for driving the trunk lid 4 in the closing direction before the trunk lid 4 shifts from the first section to the second section (STEP-DOWN process). This makes it possible to prevent the closing speed of the trunk lid 4 from increasing (fluctuating) drastically, thus making it possible to achieve smooth and good appearance when closure driving. When a predetermined termination condition is satisfied after the commencement of STEP-DOWN process, the driving output (the rotational speed of the drive motor) of the extendable/retractable drive unit 10 is feedback-controlled based on the deviation of a target closing speed for control of the trunk lid 4 and the current closing speed.

The extendable/retractable drive unit 10, which drives the trunk lid 4 in the closing direction, has a no-load range which is created by play between the driver and the hinged portion at the commencement of the movement of the extendable/retractable drive unit 10 from an open resting state. Similar to the present embodiment, it is possible to prevent noise from occurring with efficiency at the commencement of the driving of the trunk lid 4 in the closing direction by carrying out so-called STEP-UP process, which stepwisely increases the driving output, in the case of driving the trunk lid 4 in an open resting state in the closing direction. If the driving output is increased in a stroke from an open resting state of the trunk lid 4, there is a possibility of the drive motor rotating at high speed (idling in the no-load range) and thereby causing noise at the commencement of the driving of the trunk lid 4 in the closing direction.

Additionally, in, e.g., a four-link type of power trunk lid apparatus, the driving output (load) required at the commencement of the movement of the trunk lid from an open resting state thereof is great. However, upon coming through the point where the driving output (load) is great, the driving output (load) drops rapidly, so that there is a possibility of the trunk lid preceding under its own weight. Similar to the present embodiment, it is possible to prevent problems which may be caused by the preceding movement of the trunk from occurring and hand over to the subsequent closing actuation (feedback control) smoothly by carrying out the so-called STEP-DOWN process, which stepwisely decreases the driving output of the extendable/retractable drive unit 10 for driving the trunk lid 4 in the closing direction.

In the following description, operations of the power trunk lid apparatus 1 in the first and second embodiments according to the prevent invention (details of the control therefor by the drive control unit 50) will be described hereinbelow with reference to the flowcharts shown in FIGS. 7 and 8.

First Embodiment

Figure 7:
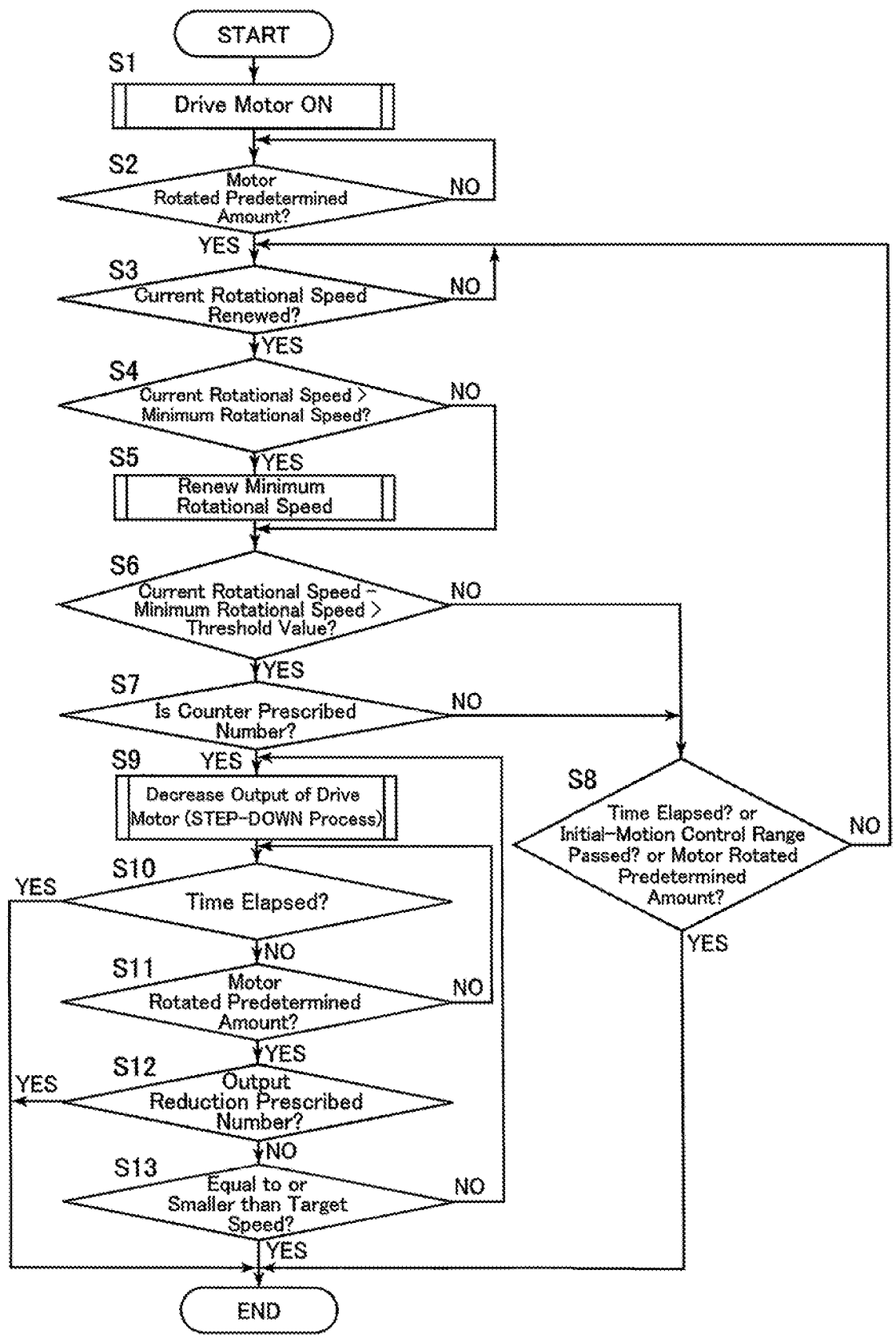
FIG. 7 is a flow chart illustrating operations of the power trunk lid apparatus (details on control by a drive control unit) in a first embodiment according to the present invention.

FIG. 7 is a flowchart for illustrating operations of the power trunk lid apparatus 1 (details of the control therefor by the drive control unit 50) in the first embodiment of the present invention.

In the case where the trunk lid 4 is in an open resting state at the fully-opened position, upon a trunk closing-operation signal being input from the receiver 51, the drive controller 50Y turns ON the driving output of the trunk drive motor M1 (step S1), and waits for the trunk drive motor M1 to rotate by a predetermined amount (step S2: NO). Upon the trunk drive motor M1 rotating by a predetermined amount (step S2: YES), STEP-UP process, which stepwisely increases the driving output of the trunk drive motor M1, is performed.

During the execution of STEP-UP process, the drive section predictor 50X monitors the current rotational speed of the trunk drive motor M1 and renews the same every time a pulse is counted (step S3: YES).

The drive section predictor 50X determines whether or not the renewed current rotational speed of the trunk drive motor M1 is smaller than the minimum rotational speed (step S4). When determining that the current rotational speed of the trunk drive motor M1 is smaller than the minimum rotational speed (step S4: YES), the drive section predictor 50X renews the current rotational speed of the trunk drive motor M1 into the minimum rotational speed (step S5). On the other hand, the drive section predictor 50X does not renew the current rotational speed of the trunk drive motor M1 into the minimum rotational speed when determining that the current rotational speed of the trunk drive motor M1 is not smaller than the minimum rotational speed (step S4: NO). A predetermined value is preset as the initial value of the minimum rotational speed as its default.

The drive section predictor 50X determines whether or not the current rotational speed of the trunk drive motor M1 from which the minimum rotational speed is subtracted has become greater than a predetermined threshold value (step S6). When the drive section predictor 50X determines that the current rotational speed of the trunk drive motor M1 from which the minimum rotational speed is subtracted has become greater than the predetermined threshold value (step S6: YES), the drive section predictor 50X increments a determination counter by 1 and determines whether or not this determination counter has reached a prescribed number (e.g., two) (step S7). When the drive section predictor 50X determines that the current rotational speed of the trunk drive motor M1 from which the minimum rotational speed is subtracted has not become greater than the predetermined threshold value (step S6: NO), the drive section predictor 50X does not increment the determination counter and resets the counter to 0.

The drive section predictor 50X repeats the above described processing loop from step S3 to step S7 until determining, a prescribed number of times, that the current rotational speed of the trunk drive motor M1 from which the minimum rotational speed is subtracted has become greater than the predetermined threshold value (step S7: NO).

If a predetermined period of time elapses, if an initial-motion control range has been passed or if the trunk drive motor M1 has rotated by the predetermined amount before determining, a prescribed number of times (during the execution of the processing loop from step S3 to step S7), that the current rotational speed of the trunk drive motor M1 from which the minimum rotational speed is subtracted has become greater than the predetermined threshold value (step S8: YES), the drive section predictor 50X determines that some sort of error has occurred and ends the process.

Upon determining, a prescribed number of times, that the current rotational speed of the trunk drive motor M1 from which the minimum rotational speed is subtracted has become greater than the predetermined threshold value (step S7: YES), the drive section predictor 50X predicts that the trunk lid 4 will shift from the first section to the second section, namely, that the trunk lid 4 will shortly move to the second section even though the trunk lid 4 currently stays in the first section. Subsequently, according to the prediction result by the drive section predictor 50X, the drive controller 50Y performs STEP-DOWN process, which decreases the driving output (the rotational speed of the trunk drive motor M1) of the extendable/retractable drive unit 10 for driving the trunk lid 4 in the closing direction, before the trunk lid 4 shifts from the first section to the second section (step S9).

In STEP-DOWN process, every time a pulse is counted with the STEP-DOWN transition position as a reference, the duty is lowered stepwisely to bring the rotational speed of the drive motor to a target speed. The way of lowering the duty is flexible; however, for instance, based on the average value of the pulse widths of the two pulse counts (the output voltage is fixed) proximate to a target pulse count, the output voltage and continuation count number of the target pulse count can be changed in three stages (Low/Middle/High). The technique of lowering the duty in a stroke in response to the first pulse count after the transition to STEP-DOWN and maintaining this lowered duty for a predetermined number of counts (8 counts) is also possible.

Figure 9:
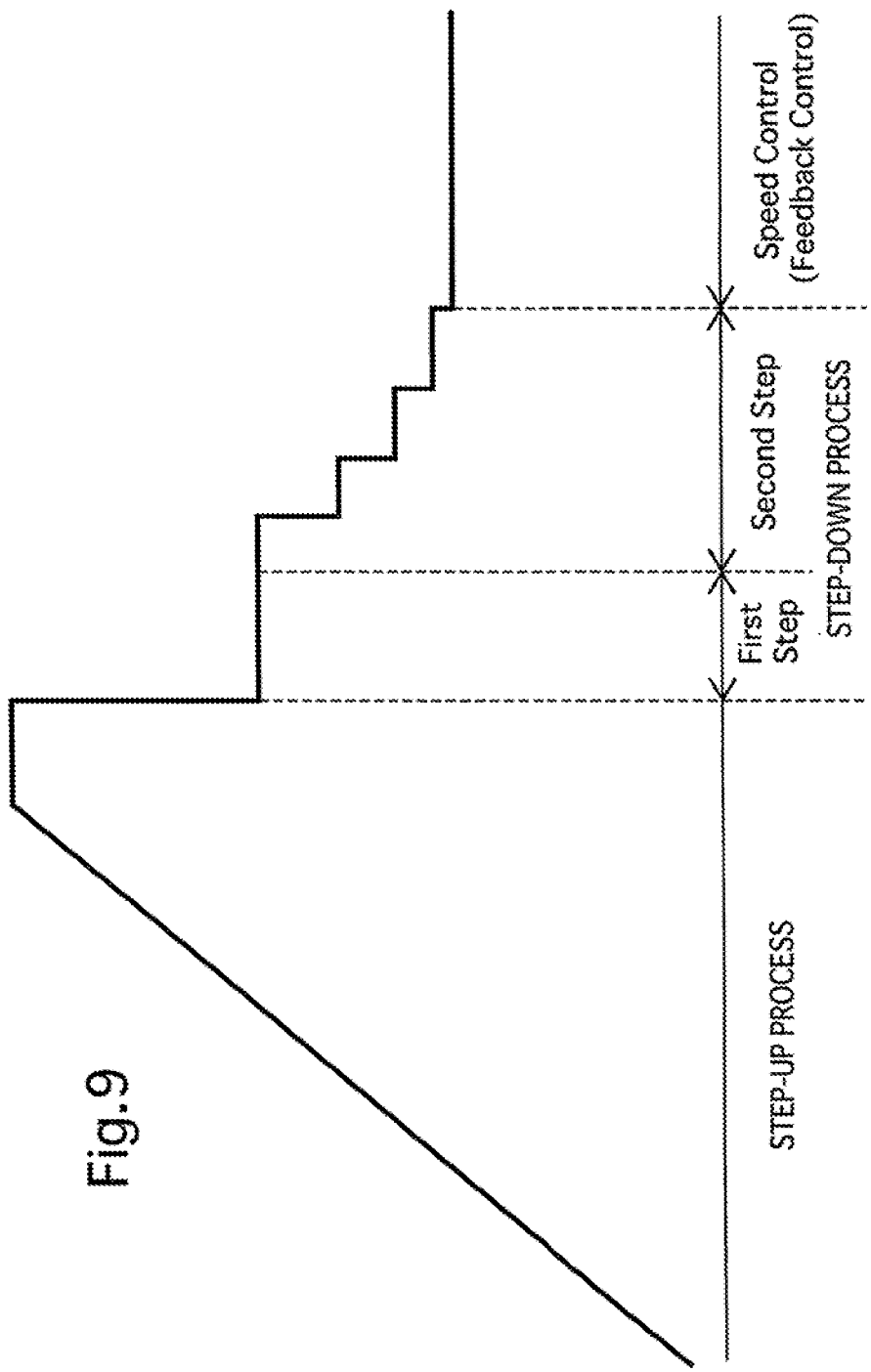
FIG. 9 is a diagram illustrating an example of how to step down an output in STEP-DOWN process.
Figure 10:
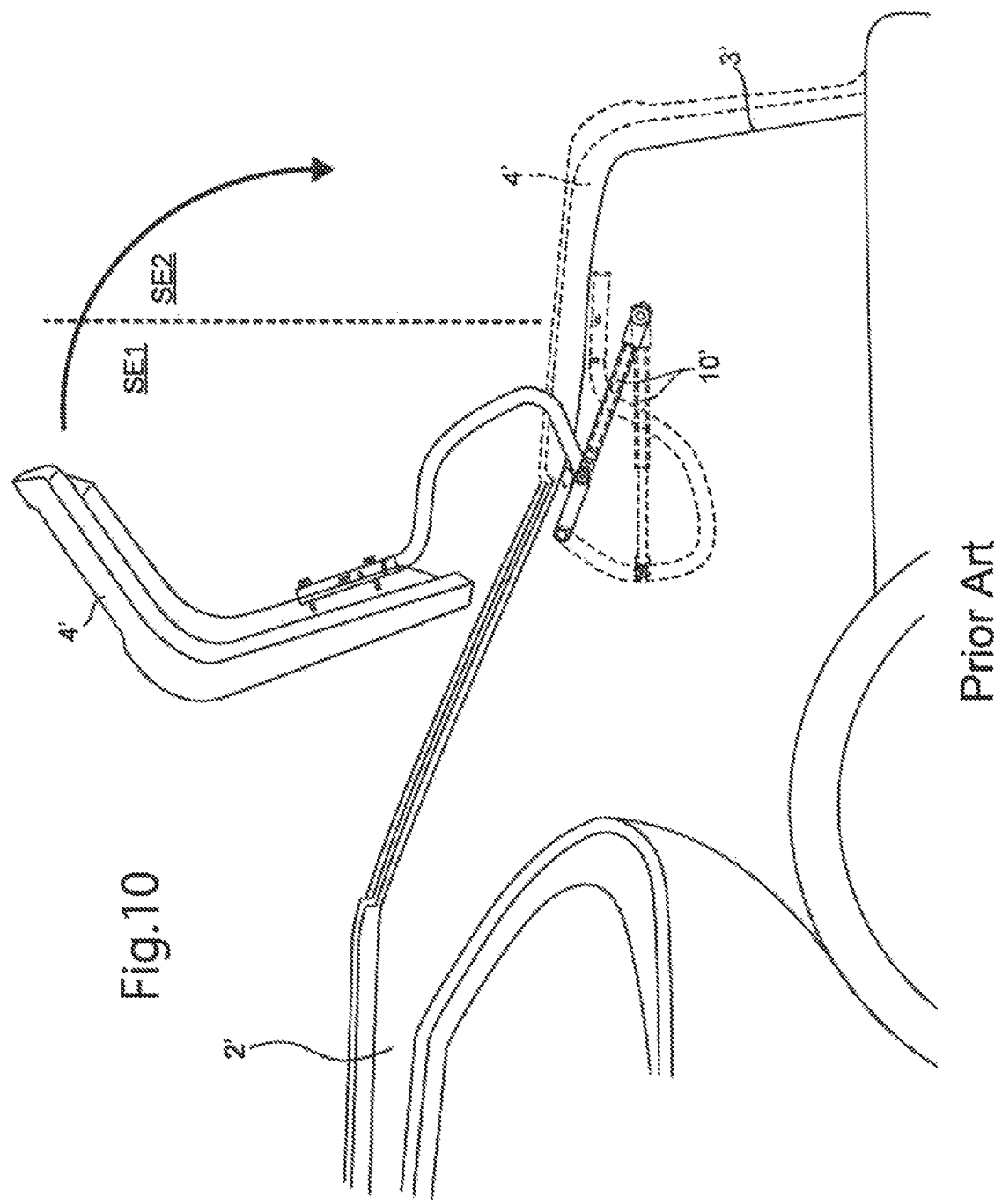
FIG. 10 is a first diagram illustrating a technical problem in a conventional power trunk lid mounted to a vehicle.

FIG. 9 shows an example of the way of lowering the output in STEP-DOWN process. In this drawing, the first step at which the duty is lowered in a stroke (the lowering target is assumed to be the order of 8 V) and maintained for a predetermined number of counts (8 counts) upon the issue of the first pulse count after the transition to STEP-DOWN and the subsequent second step at which the duty is lowered stepwisely to bring the rotational speed of the drive motor to a target speed every time every time a pulse is counted are performed in that order. In the case where a pulse width which is equal to or greater than two consecutive pulse widths is detected during the execution of the second step or the case where the first step and the second step are normally performed, it is conceivable that the closing speed of the trunk lid 4 has reached the target speed, so that control moves to the subsequent speed control (feedback control). Control moves to the subsequent speed control (feedback control) also when a predetermined period of time (e.g., one second) elapses after the transition to STEP-DOWN. In STEP-DOWN process, the speed buffer is not cleared so that control can move to the subsequent speed control (feedback control).

In STEP-DOWN process, the drive controller 50Y firstly rotates the trunk drive motor M1 by a predetermined amount (step S11: YES); subsequently, every time a pulse is counted, the drive controller 50Y monitors the rotational speed of the trunk drive motor M1 and compares the current rotational speed with the previous rotational speed. Upon the pulse count at which the current rotational speed is lower than the previous rotational speed reaching a prescribed number of counts (e.g., two consecutive counts) (step S12: YES) or upon the current rotational speed becoming equal to or smaller than a target speed (step S13: YES), control moves to the subsequent closing actuation (feedback control) and the drive controller 50Y ends the process on the assumption that STEP-DOWN process has been normally completed. On the other hand, upon a lapse of a predetermined period of time (e.g., one second) before the trunk drive motor M1 rotates by the predetermined amount following the transition of control to STEP-DOWN process (step S10: YES), control moves to the subsequent closing actuation (feedback control) and the drive controller 50Y ends the process because it is conceivable that the the trunk lid 4 has already shifted to the second section though there remains a possibility of STEP-DOWN process not having been normally completed.

Second Embodiment

Figure 8:
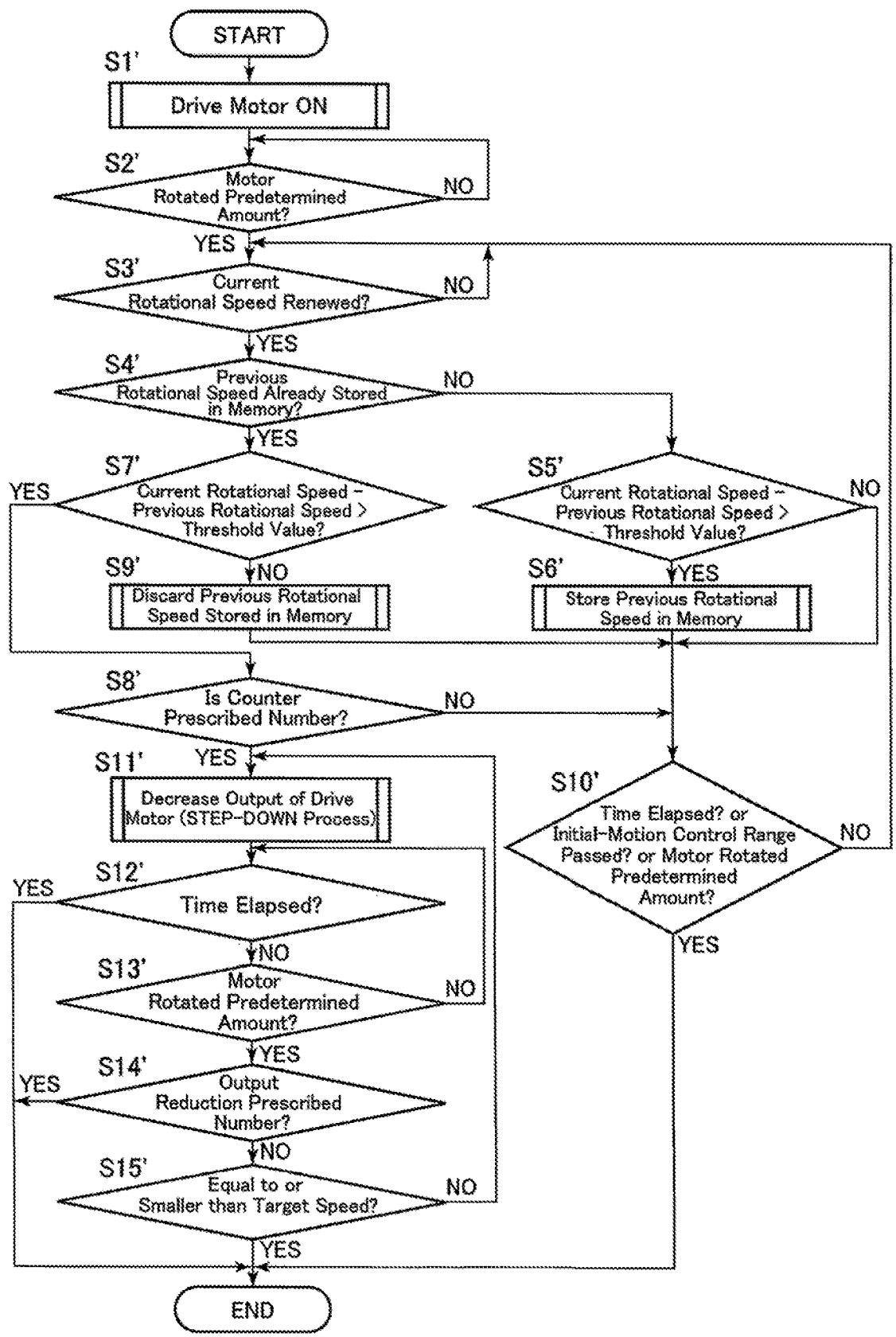
FIG. 8 is a flow chart illustrating operations of the power trunk lid apparatus (details on control by a drive control unit) in a second embodiment according to the present invention.

FIG. 8 is a flowchart for illustrating operations of the power trunk lid apparatus 1 (details of the control therefor by the drive control unit 50) in the second embodiment of the present invention.

In the case where the trunk lid 4 is in an open resting state at the fully-opened position, upon a trunk closing-operation signal being input from the receiver 51, the drive controller 50Y turns ON the driving output of the trunk drive motor M1 (step S1'), and waits for the trunk drive motor M1 to rotate by a predetermined amount (step S2': NO). Upon the trunk drive motor M1 rotating by the predetermined amount (step S2': YES), STEP-UP process, which stepwisely increases the driving output of the trunk drive motor M1, is performed.

During the execution of STEP-UP process, the drive section predictor 50X monitors the current rotational speed of the trunk drive motor M1 and renews the same every time a pulse is counted (step S3': YES).

The drive section predictor 50X sets the previous rotational speed to the initial value which has been set as a default value because the previous rotational speed of the trunk lid motor M1 is not already memorized at the first pulse count after the transition to STEP-UP (step S4': NO). Subsequently, the drive section predictor 50X determines whether or not the current rotational speed of the trunk drive motor M1 from which the previous rotational speed is subtracted has become greater than a predetermined threshold value (step S5'). When the drive section predictor 50X determines that the current rotational speed of the trunk drive motor M1 from which the previous rotational speed is subtracted has become greater than said predetermined threshold value (step S5': YES), the drive section predictor 50X stores the current rotational speed of the trunk drive motor M1 as the previous rotational speed thereof in memory (step S6'). When the drive section predictor 50X determines that the current rotational speed of the trunk drive motor M1 from which the previous rotational speed is subtracted has not become greater than the predetermined threshold value (step S5': NO), the drive section predictor 50X retains the previous rotational speed of the trunk drive motor M1 as is.

At the second or subsequent pulse count after the transition to STEP-UP, the drive section predictor 50X already stores the previous rotational speed of the trunk drive motor M1 in memory (STEP S4': YES). Similar to the above described step S5', the drive section predictor 50X determines whether or not the current rotational speed of the trunk drive motor M1 from which the previous rotational speed is subtracted has become greater than the predetermined threshold value (step S7'). When the drive section predictor 50X determines that the current rotational speed of the trunk drive motor M1 from which the previous rotational speed is subtracted has become greater than the predetermined threshold value (step S7': YES), the drive section predictor 50X increments a determination counter by 1 and determines whether or not this determination counter has reached a prescribed number (e.g., two) (step S8'). When the drive section predictor 50X determines that the current rotational speed of the trunk drive motor M1 from which the previous rotational speed is subtracted has not become greater than the predetermined threshold value (step S7': NO), the drive section predictor 50X does not store the current rotational speed of the trunk drive motor M1 as the previous rotational speed thereof, thus discarding this data, and sets the counter value to 0 (step S9').

The drive section predictor 50X repeats the processing loop at the above described steps S3', S4', S5' and S6' and also the processing loop at the above described steps S3', S4', S7' and S9' until determining, a prescribed number of times, that the current rotational speed of the trunk drive motor M1 from which the previous rotational speed is subtracted has become greater than the predetermined threshold value (step S8': NO).

If a predetermined period of time elapses, if an initial-motion control range has been passed or if the trunk drive motor M1 has rotated by the predetermined amount before determining, a prescribed number of times (during the execution of the aforementioned processing loops), that the current rotational speed of the trunk drive motor M1 from which the previous rotational speed is subtracted has become greater than the predetermined threshold value, the drive section predictor 50X determines that some sort of error has occurred and ends the process.

Upon determining, a prescribed number of times, that the current rotational speed of the trunk drive motor M1 from which the previous rotational speed is subtracted has become greater than the predetermined threshold value (step S8': YES), the drive section predictor 50X predicts that the trunk lid 4 will shift from the first section to the second section, namely, that the trunk lid 4 will shortly move to the second section though the trunk lid 4 currently stays in the first section. Subsequently, the drive controller 50Y performs STEP-DOWN process, which decreases the driving output (the rotational speed of the trunk drive motor M1) of the extendable/retractable drive unit 10 for driving the trunk lid 4 in the closing direction before the drive section of the trunk lid 4 shifts from the first section to the second section (step S11').

In STEP-DOWN process, the drive controller 50Y firstly rotates the trunk drive motor M1 by a predetermined amount (step S13': YES); thereafter, every time a pulse is counted, the drive controller 50Y monitors the rotational speed of the trunk drive motor M1 and compares the current rotational speed with the previous rotational speed. Upon the pulse count at which the current rotational speed is lower than the previous rotational speed reaching a prescribed number (e.g., two consecutive counts)(step S14': YES) or upon the current rotational speed becoming equal to or smaller than a target speed (step S15': YES), control moves to the subsequent closing actuation (feedback control) and the drive controller 50Y ends the process on the assumption that STEP-DOWN process has been normally completed. On the other hand, upon a lapse of a predetermined period of time (e.g., one second) before the trunk drive motor M1 rotates by the predetermined amount following the transition of control to STEP-DOWN process (step S12': YES), control moves to the subsequent closing actuation (feedback control) and the drive controller 50Y ends the process because it is conceivable that the trunk lid 4 has already shifted to the second section though there remains a possibility of STEP-DOWN process not having been normally completed.

<<Calculation of Decrement in Rotational Speed of Trunk Drive Motor M1 in Step-Down Process>>

Although STEP-DOWN process, which decreases the driving output (the rotational speed of the trunk drive motor M1) of the extendable/retractable drive unit 10 for driving the trunk lid 4 in the closing direction, is performed at step S9 of the flowchart shown in FIG. 7 and step S11' of the flowchart shown in FIG. 8, the decrement in the rotational speed of the trunk drive motor M1 can be optimally set according to various parameters. More specifically, in accordance with at least one of the following factors: the temperature of the extendable/retractable drive unit 10 or the ambient temperature thereof, the inclination of the vehicle body 2, to which the trunk lid 4 is mounted, and counterforce (e.g., gas-stay counterforce) caused by the extendable/retractable drive unit 10, the drive controller 50Y can alter the manner of decreasing the driving output (the rotational speed of the trunk drive motor M1) of the extendable/retractable drive unit 10 for driving the trunk lid 4 in the closing direction. For instance, based on the transition position to STEP-DOWN, the drive controller 50Y determines a reference output value at a predetermined temperature (e.g., 20 degrees Celsius) from a table or using a calculation formula. This reference output value is determined with reference to a predetermined temperature (e.g., 20 degrees of Celsius) in consideration of the amount of variation of the counterforce of the extendable/retractable drive unit 10. Then, with reference to the transition position to STEPDOWN, control moves to the closing actuation (feedback control) and the drive controller 50Y ends the process following a pulse-width fluctuation buffering section of a fixed number of counts.

As described above, according to the present embodiment of the power trunk lid apparatus 1, when the extendable/retractable drive unit (driver) 10 drives the trunk lid (opening-and-closing body) 4 in the closing direction from the first section toward the second section, the drive section predictor (predictor) 50X predicts that the trunk lid 4 will shift from the first section to the second section, and the drive controller 50Y decreases the driving output of the extendable/retractable drive unit 10 (the rotational speed of the trunk drive motor M1) for driving the trunk lid 4 in the closing direction, in accordance with the prediction result obtained from the drive section predictor 50X, which prevents the closing speed of the trunk lid 4 from increasing (fluctuating) drastically, thus making it possible to achieve smooth and good appearance when closure driving.

Although the above embodiment has been illustrated by illustrating, by an example, the case where the drive section predictor 50X predicts that the trunk lid 4 will shift from the first section to the second section based on the rotational speed of the trunk drive motor M1 of the extendable/retractable drive unit 10, the present invention is not limited to this embodiment. For instance, an embodiment in which an opening position detection sensor which detects the opening position of the trunk lid 4 is provided to predict that the drive section predictor 50X predicts that the trunk lid 4 will shift from the first section to the second section based on the opening position of the trunk lid 4 detected by the opening position detection sensor is also possible. The opening position detection sensor can include an opening position detector (encoder) which is installed to the trunk drive motor M1 and an inclination sensor which detects the inclination of the vehicle body 2, to which the trunk lid 4 is mounted. Since the position and the timing at which the trunk lid 4 shifts from the first section to the second section vary depending on the inclination of the vehicle body 2, the opening position of the trunk lid 4 can be detected with high precision by taking the inclination of the vehicle body 2 into account.

Although the above embodiment has been illustrated by illustrating, by an example, the case where a drive control apparatus for an opening-and-closing body according to the present invention has been applied to the power trunk lid apparatus 1, the drive control apparatus for an opening-and-closing body according to the present invention can also be applied to a driving apparatus for a different opening-and-closing body of a vehicle such as a power back door. Additionally, the drive control apparatus for an opening-and-closing body according to the present invention can also be applied to a driving apparatus for any other type of opening-and-closing body, other than for vehicle use.

Although the above embodiment has been illustrated by illustrating, by an example, the case where the driving of the trunk lid 4 in the closing direction by the extendable/retractable drive unit 10 (the rotational speed of the trunk drive motor M1) starts from the fully-opened position of the trunk lid 4, the start position of the driving of the trunk lid 4 in the closing direction by the extendable/retractable drive unit 10 (the rotational speed of the trunk drive motor M1)

can be set to an arbitrary position in "the first section," in which the trunk lid 4 is driven in the closing direction against its own weight.

INDUSTRIAL APPLICABILITY

The opening-and-closing body according to the present invention is suitable for application in, e.g., a drive apparatus of a vehicle opening-and-closing body such as, e.g., a power trunk lid or a power back door, etc.

REFERENCE SIGNS LIST

1 Power trunk lid apparatus
2 Vehicle body (main body)
3 Trunk opening (opening)
4 Trunk lid (opening-and-closing body)
5 Hinge member
5a Pivot shaft
6 Stopper member
7 Weather strip
10 Extendable/retractable drive unit (driver)
M1 Trunk drive motor (PTL motor)
11 Bottomed housing
11a Inner cylindrical surface
11b Stopper
12 Rotary nut
12a Outer peripheral gear
13 Rod member
13a End portion
14 Regenerative braking circuit
15 Joint
15a Ball accommodation portion
16 Joint
16a Ball accommodation portion
G Reduction mechanism
P Pinion gear
20 Closer drive mechanism
M2 Closer drive motor (LCL motor)
30 Lock mechanism
31 Rotational shaft member
32 Hook
32a Rotational support hole
32b Striker holding groove
32c Fully-latched engaging portion
32d Half-latched engaging portion
33 Rotational shaft member
34 Ratchet
34a Lock portion
40 Striker
50 Drive control unit
50X Drive section predictor (predictor)
50Y Drive controller
51 Receiver
51a Wireless remote controller
52 Half-latched detector
53 Fully-latched detector
54 Closing-speed detector (rotational speed detector)

The invention claimed is:

1. An opening-and-closing apparatus, comprising:
an opening-and-closing body configured to move between an open position and a closed position to open and close an opening, as the opening-and-closing body moves in a closing direction from the open position towards the closed position, the opening-and-closing body first moves through a first section of movement against the weight of the opening-and-closing body and then moves through a second section of movement wherein the weight of the opening-and-closing body acts to facilitate the movement of the opening-and-closing body in the closing direction;
a driver configured to drive said opening-and-closing body in said closing direction continuously from said open position to said closed position through said first and second sections of movement;
a predictor configured to make a prediction when said opening-and-closing body will shift from said first section of movement to said second section of movement as said driver drives said opening-and-closing body in said closing direction toward said closed position from said open position; and
a drive controller configured to decrease a driving output of said driver for driving said opening-and-closing body in said closing direction according to a result of said prediction made by said predictor.

2. The opening-and-closing apparatus according to claim 1, wherein said driver comprises a drive motor configured to drive said opening-and-closing body in said closing direction, and
wherein said predictor makes said prediction based on a rotational speed of said drive motor.

3. The opening-and-closing apparatus according to claim 1, further comprising an open position detection sensor which detects said open position of said opening-and-closing body,
wherein said predictor makes said prediction based on said open position of said opening-and-closing body that is detected by said open position detection sensor.

4. The opening-and-closing apparatus according to claim 1, wherein, when said driver commences the driving of said opening-and-closing body in said closing direction from said open position, said drive controller stepwisely increases, said driving output of said driver for driving said opening-and-closing body in said closing direction, and thereafter decreases said driving output of said driver for driving said opening-and-closing body in said closing direction based on said prediction from said predictor.

5. The opening-and-closing apparatus according to claim 1, wherein said drive controller alters a manner of decreasing said driving output of said driver for driving said opening-and-closing body in said closing direction in accordance with at least one of the following factors: a temperature of said driver, ambient temperature, an inclination of a main body to which said opening-and-closing body is mounted, and a counterforce caused by said driver.

* * * * *